United States Patent [19]
Berberich, Jr.

[11] Patent Number: 5,805,683
[45] Date of Patent: Sep. 8, 1998

[54] SYSTEM AND METHOD FOR ROUTING GROUND-TO-AIR TELEPHONE CALLS

[75] Inventor: Edward Charles Berberich, Jr., Green Brook, N.J.

[73] Assignee: AT&T Corp, Middletown, N.J.

[21] Appl. No.: 633,640

[22] Filed: Apr. 17, 1996

[51] Int. Cl.⁶ .............................. H04M 1/56; H04M 15/06
[52] U.S. Cl. ......................... 379/142; 379/120; 379/127; 379/140; 379/220; 455/431; 455/445
[58] Field of Search ........................... 379/111–116, 144, 379/58, 59, 60, 91, 142, 220, 221, 120, 121, 122, 123, 127, 130, 140; 455/11.1, 12.1, 431, 435, 445; 370/316, 323

[56] References Cited

U.S. PATENT DOCUMENTS

| | | | |
|---|---|---|---|
| 5,519,761 | 5/1996 | Gilhousen | 455/11.1 |
| 5,592,539 | 1/1997 | Amarant et al. | 379/115 |

OTHER PUBLICATIONS

"GTE Airfone Makes Telephone Contact With Air Travelers A Two–Way Street", Advanced Intelligent Network News, Oct. 5, 1994, 114, at 5,6.

*Primary Examiner*—Paul Loomis
*Assistant Examiner*—Binh K. Tieu

[57] ABSTRACT

A system for completing calls to a passenger aboard an aircraft. The passenger activates ground-to-air service by accessing a ground-to-air database subsystem that is located on the ground. The passenger gains access to the ground-to-air database by dialing a special service number and entering a Master Personal Identification Number (Master PIN). Once access to the database is obtained, the passenger may enter one or more ground-to-air forwarding parameters which enable the system to forward ground initiated calls directly to the passenger. At anytime after ground-to-air service has been activated, but before it is terminated, a person on the ground may initiate a call to the passenger by dialing the special service number. In a preferred embodiment, a Ground-to-Air User PIN is employed to screen ground callers.

24 Claims, 3 Drawing Sheets

SYSTEM AND METHOD FOR ROUTING GROUND-TO-AIR TELEPHONE CALLS

FIELD OF THE INVENTION

This invention is related to telecommunications, and more particularly to communications between a calling party located on the ground and a called party located aboard an aircraft.

BACKGROUND OF THE INVENTION

At the present time, persons have a very limited ability to originate telephone calls to called parties on board an aircraft. The currently available system amounts to little more than a paging system for air travelers. Callers to a person on board the aircraft must initiate a call, hang up, and then wait for a return call.

Under the present system a passenger who would like to receive calls while airborne is issued a 10-digit "personal aircall number" and a Personal Identification Number, or "PIN". The personal aircall number is a number that a person on the ground must have to call the airborne passenger. The PIN is a number that the passenger uses to identify himself/herself to the system. The passenger activates ground-to-air service by calling a ground database and informing the database of the flight and seat number. Once the service has been activated, a caller wishing to contact the passenger dials a special access number to connect to the ground database. After being connected to the database, the caller enters the passenger's aircall number and their own telephone number. At this point, the caller must hang up and wait for a return call.

The ground database searches its records for a match of the entered aircall number, and, if it finds such a match, initiates a call to the passenger's aircraft. The aircraft phone rings and displays the seat number. The passenger for whom the call is intended enters his/her PIN and the telephone responds by displaying the caller's telephone number. At this point, the passenger can either except or reject the call based upon the ground caller's number. If the passenger accepts the call, the aircraft phone places a call to the ground caller's number. Thus, the present ground-to-air calling system amounts to a paging system which merely adds the ability to return a ground caller's call by pressing the single "accept" button instead of manually dialing the ground caller's number.

SUMMARY OF THE INVENTION

The present invention offers a more robust system for completing ground-to-air phone calls. In particular, the invention provides for "direct" phone calls to aircraft passengers, and thus does not act like the prior "paging" type ground-to-air systems.

In order to receive calls from the ground, a passenger activates ground-to-air service by initiating a call to a special service number. By dialing the special service number the passenger is connected to a ground-to-air database subsystem that is located on the ground. The passenger gains access to the ground-to-air database subsystem by entering a Master Personal Identification Number (Master PIN). Once access to the database subsystem is obtained, the passenger may enter one or more ground-to-air forwarding parameters which enable the system to forward ground initiated calls directly to the airborne passenger.

At anytime after ground-to-air service has been activated, but before it is terminated, a person on the ground may initiate a call to the passenger by dialing the special service number. In a preferred embodiment, a ground caller who dials the special service number is connected to the ground-to-air database subsystem, which prompts the caller for a Personal Identification Number (PIN)—the database subsystem is capable of distinguishing PINs entered by ground callers from subscriber Master PINs. The caller must enter a valid Ground-to-Air User PIN (User PIN) to have the call forwarded to the passenger. If no User PIN is entered, or an invalid User PIN is entered, the call may be terminated or passed to some alternative treatment.

DETAILED DESCRIPTION

Figure 1:
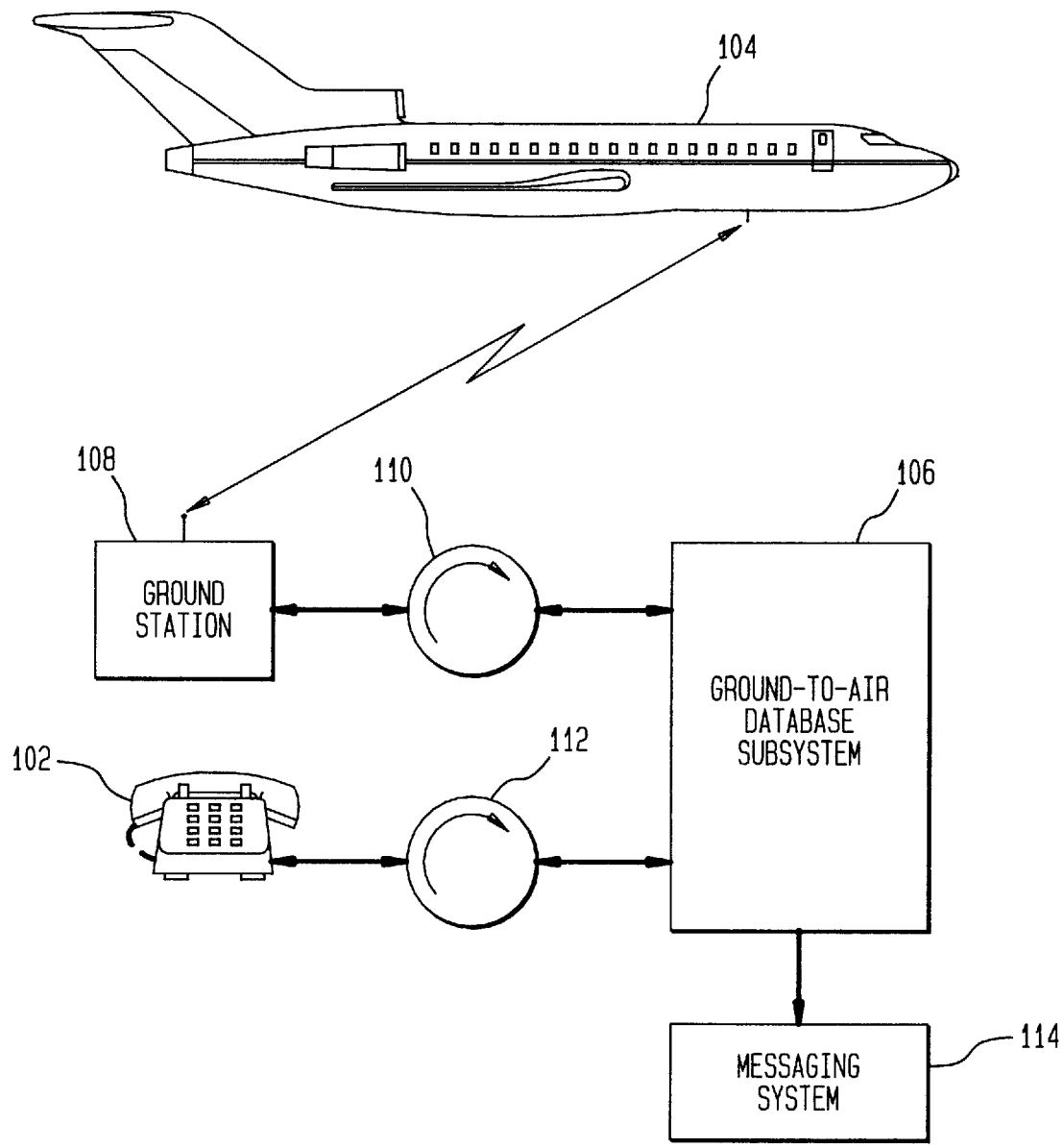
FIG. 1 is a plan view of a ground-to-air calling system constructed in accordance with the principles of the invention.

Referring to FIG. 1, there is shown a plan view of a ground-to-air calling system constructed in accordance with the principles of the present invention. As can be seen from the figure, the ground-to-air system may be used to complete a call initiated from a ground based telephone 102 and directed to a passenger (or "subscriber") aboard an aircraft 104. The system includes a ground-to-air database subsystem 106. The database subsystem is used to store one or more ground-to-air forwarding parameters that are provided by the subscriber as part of a ground-to-air system set up procedure. The database subsystem receives ground based calls that are directed to the airborne subscriber and uses the forwarding parameters to forward those calls to the subscriber. A ground station 108 provides a two-way radio link between the calling party's telephone and the aircraft.

As mentioned above, the subscriber must execute a ground-to-air set up procedure in order to receive calls while airborne. To carry out the set up procedure the subscriber dials a special service number which connects the subscriber to the ground-to-air database subsystem. The subscriber may initiate the set up procedure from a ground based telephone before boarding the aircraft, in which case conventional telephone network switching equipment may be used to connect the subscriber to the database subsystem; or the subscriber may initiate the set up while on board the aircraft, either before or during flight, in which case the ground station connects the subscriber's call to the telephone network. In either case, the telephone network may recognize the special service number by its prefix. For example, the special service number may be an American Telephone & Telegraph Co., Inc. (AT&T) True Connections® 500 number, which has a 500 prefix. Thus, when a passenger dials the True Connections® 500 number from the aircraft, the ground station relays the number to a network switch 110, such as an AT&T 5ESS® switch, which recognizes the number by its 500 prefix, and accordingly routes the number to the ground-to-air database subsystem.

In a preferred embodiment the ground-to-air database subsystem is an AT&T Quantum Data Routing System (QDRS). In such an embodiment, the subsystem can perform both database and Voice Response Unit (VRU) functions. As part of the subsystem's database functions, it maintains a current list of special service numbers that are being used for ground-to-air service. Each number is cross-referenced to a Master Personal Identification Number (Master PIN). A subscriber must know the Master PIN in order to gain access to the subsystem and execute the set up procedure.

Once the subscriber is connected to the subsystem, the subsystem may perform the VRU function of prompting the subscriber for a PIN. Of course, a prompt is not necessary, but it is desired in the preferred embodiment. In any event, the subscriber must enter the Master PIN. One way for the subscriber to enter the Master PIN is to simply recite it over the voice line, another way is through Dual Tone Multi Frequency (DTMF) signaling. Of course, in the former case, the subsystem must be capable of voice recognition. Regardless of how the Master PIN is entered, the subsystem checks it against the stored Master PIN for the subscriber's special service number, and grants the subscriber access if the PINs match. At this point the subscriber may activate ground-to-air forwarding by transmitting an activation signal to the subsystem, e.g., through one or more DTMF signals.

The mere activation of ground-to-air forwarding is sufficient to enable ground calls to be forwarded to the subscriber, provided that the ground-to-air database has been previously supplied with an aircall number, at which the subscriber's aircraft can be reached. However, as an option, the aircall number, and one or more additional forwarding parameters, may be entered into the database subsystem as part of the set up procedure. These additional parameters include: the subscriber's seat number, the start time and duration of ground-to-air forwarding, and a Ground-to-Air User Personal Identification Number (Ground-to-Air User PIN). The subscriber's seat number may be used by the system to forward calls directly to a phone associated with the subscriber's seat, if such a phone is available. The start time and duration of ground-to-air forwarding allows the subscriber to specify the period of forwarding activation—an alternative being that forwarding is active for a fixed predetermined period of time following a simple on/off indication from the subscriber. The Ground-to-Air User PIN (or "User PIN"), to be described in more detail below, can be used as a means of caller screening. When a User PIN is employed, only those ground callers with knowledge of the User PIN can have their calls forwarded to the subscriber. It should be noted that, like the aircall number, any of the foregoing additional parameters may be entered prior to the set up procedure.

Upon completion of the ground-to-air set up procedure, ground based callers may call the airborne subscriber. Referring back to FIG. 1, when a ground based caller at telephone 102 wants to call the subscriber aboard aircraft 104, the caller dials the subscriber's special service number. The special service number is recognized by a switch 112 in the telephone network, e.g., an AT&T 5ESS® switch, which routes the call to the ground-to-air database subsystem 106. The subsystem then prompts the caller for a PIN. As was the case with the Master PIN, the prompt is optional and the PIN may be entered via voice or DTMF signaling. In any event, the subsystem recognizes the entered PIN by comparing it to the stored Master PIN and stored User PIN for the subscriber's special service number. If the caller has entered the correct User PIN, the entered User PIN matches the stored User PIN (previously provided by the subscriber) and the subsystem proceeds to forward the call to the subscriber.

The database subsystem uses the ground station to forward calls to the subscriber. Upon receiving a valid User PIN from the caller, the subsystem retrieves the called subscriber's forwarding parameters and passes them to the ground station. The subsystem also couples the call to the ground station. Both the passing of the parameters and the coupling of the call may be accomplished through the telephone network. As shown in FIG. 1, the parameters and the call may be passed to the Ground Station via switch 110—the same switch through which the subscriber was coupled to the subsystem for the purpose of ground-to-air set up. However, it should be noted that the configuration of FIG. 1 is selected merely for simplicity of presentation, and that it is not necessary for the subscriber's set up call and the ground caller's call to pass through the same switch.

In the simplest scenario, only the aircall number is passed to the ground station. As is well known in the art of telecommunications, the ground station may use the aircall number to establish a radio link with the aircraft. Once the link is established, the caller may carry on two-way communications with the subscriber over the link. If the seat number is present in the subsystem, it too may be passed to the ground station, and used to establish a radio link directly with a phone associated with the subscriber's seat.

As a further option, the ground-to-air database may acquire the caller's telephone number (the number of telephone 102 in FIG. 1) via Automatic Number Identification (ANI), and pass that number to the ground station along with the forwarding parameters. The ground station may, in turn, pass the caller's number to the aircraft so that it may be displayed at the subscriber's seat phone. In this manner, the subscriber may decide whether or not to answer the call on the basis of the displayed number. One possible way for the database subsystem to handle rejection of the call by the subscriber is for the subsystem to play an announcement to the caller indicating that the subscriber is not available and that the caller may leave a message. The message may be recorded and stored by the subsystem itself, or, as an alternative, the subsystem may couple the caller to a messaging system 114.

Figure 2A:
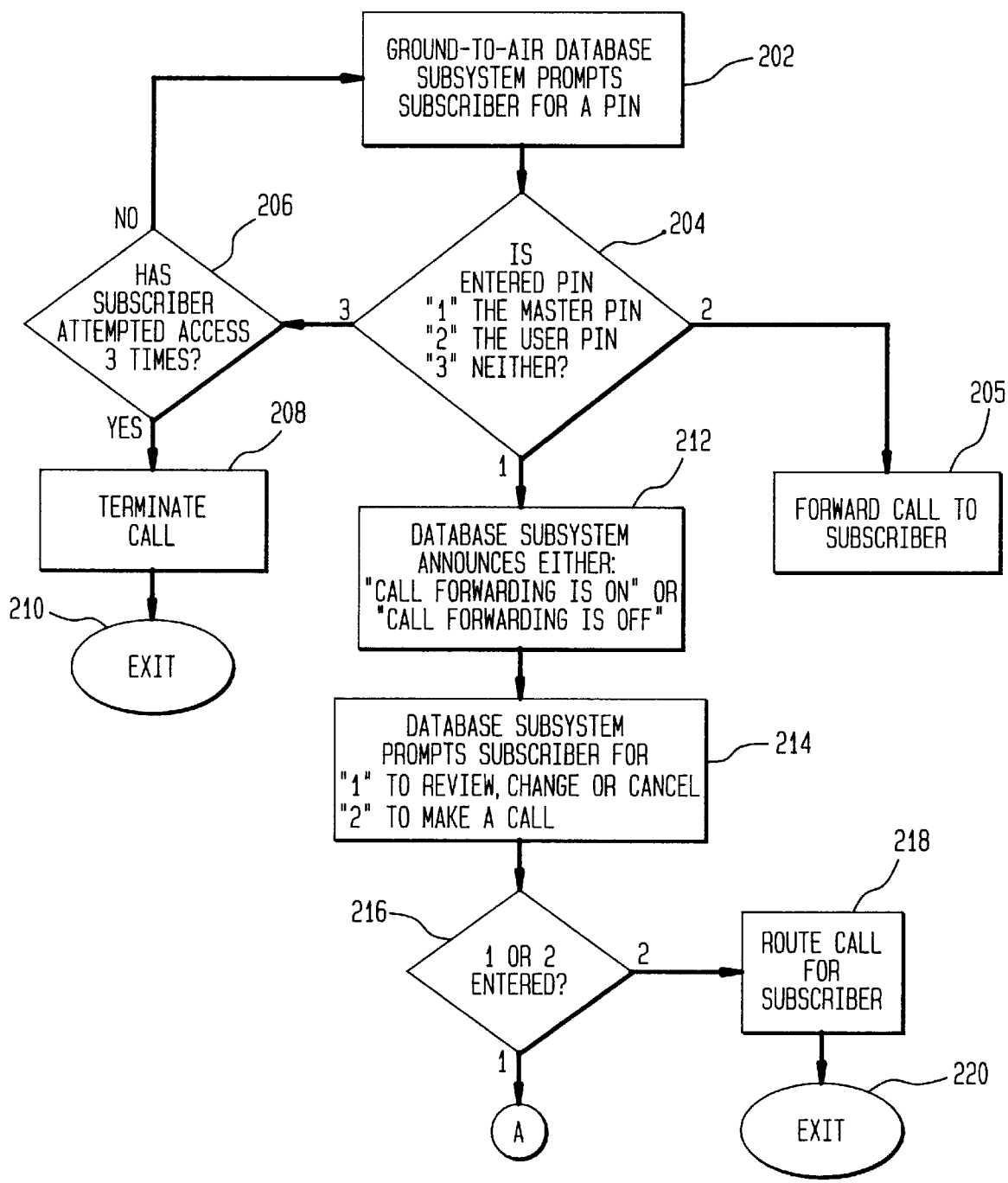
FIGS. 2A and 2B make up a flowchart depicting an exemplary ground-to-air forwarding set up procedure in accordance with the invention.
Figure 2B:
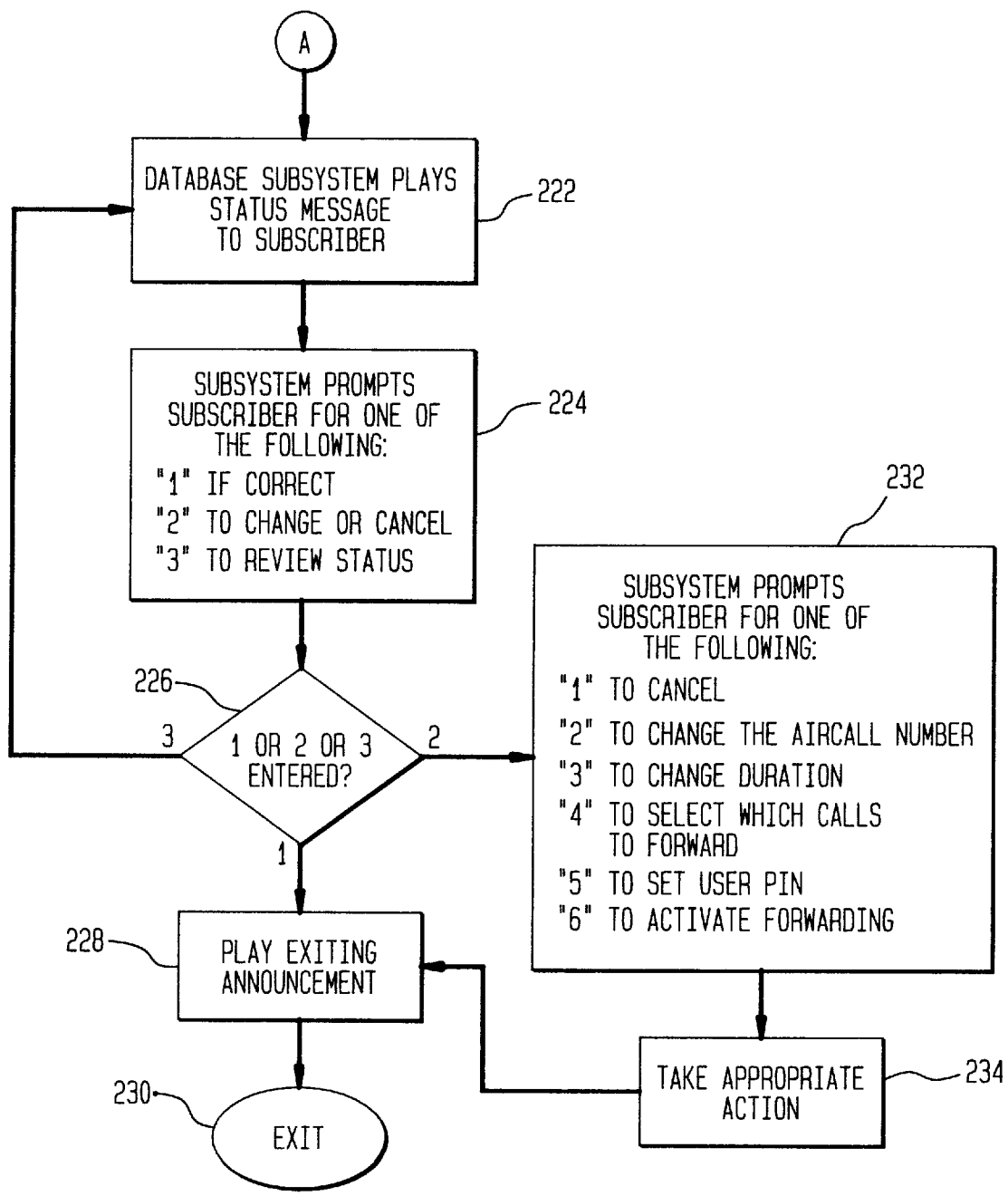

FIGS. 2A and 2B make up a flowchart depicting an exemplary ground-to-air set up procedure in accordance with the present invention. The flowchart begins at the point where the subscriber has dialed the special service number and has been connected to the ground-to-air database subsystem. Accordingly, the next step is for the ground-to-air database subsystem to query the subscriber for a PIN (step 202). Once the subscriber has made a PIN entry, the subsystem checks to see if the entry is: 1) the correct Master PIN, 2) the correct User PIN, or 3) neither (step 204). In general, a subscriber wishing to execute the set up procedure will not respond to the prompt of step 202 by entering the correct User PIN. Nevertheless, branch 2 of step 204 is included in FIG. 2A to provide context for the remainder of the FIG. 2A description. When a ground caller in possession of the User PIN attempts to contact the subscriber, the entry following step 202 will be the correct User PIN; in which case the subsystem proceeds to forward the call to the subscriber (step 205). Additional details concerning the routing of ground calls to the subscriber are not shown in FIGS. 2A and 2B.

If it is determined at step 204 that neither the correct User PIN nor the correct Master PIN has been entered, the subsystem may give the subscriber another chance to enter a PIN. The number of permissible access attempts may be limited, for example, to 3, in which case the subsystem checks the number of access attempts following each failed attempt (step 206). If the number of attempts is less than 3 the subscriber is allowed another attempt, otherwise the call is terminated (step 208) and the set up procedure is exited (step 210).

If it is determined at step 204 that the correct Master PIN has been entered, the subscriber is granted access to the database subsystem. Immediately following a granted access, the subsystem checks the stored records of the accessing subscriber and determines whether the subscriber's call forwarding is active. It then plays an appropriate message to the subscriber, either "Call Forwarding is ON", or "Call Forwarding is OFF" (step 212). After the initial announcement, the subsystem prompts the subscriber for the action the subscriber wishes to take (step 214). An exemplary prompt appears below:

Enter '1' to review, change or cancel call forwarding.

Enter '2' to make a call.

This prompt is most appropriate for the case in which the subscriber communicates with the subsystem using DTMF signaling. When voice recognition is used, the prompt should be changed to:

Say '1' to review, change or cancel call forwarding.

Say '2' to make a call.

In the event that either voice or DTMF signaling may be used, the prompt should be changed to:

Enter, or Say, '1' to review, change or cancel call forwarding.

Enter, or Say, '2' to make a call.

For purposes of simplicity of presentation, from this point on, it is assumed that DTMF signaling is used, and therefore the prompting statements that follow begin with "Enter".

The second option in the above described DTMF prompt, "Enter 2 to make a call", refers to an optional feature of the present invention. This feature allows subscribers aboard the aircraft to place calls directly to the ground based telephones. To illustrate how an airborne subscriber may place a call to a ground based telephone, references are made to FIG. 1.

In the same manner that a subscriber aboard aircraft 104 may initiate the set up procedure, the subscriber may initiate a call to ground based telephone 102. The subscriber dials the special service number and is linked to database subsystem 106 via the ground station 108 and network switch 110. At this point steps 202–214 are executed as described above. The subscriber responds to the prompt of step 214 with a '2'. When the subsystem checks the response to step 214 (step 216), it recognizes that a '2' has been entered and then proceeds to route the subscriber's call to the ground telephone (step 218). The call may be routed through network switch 112 such that the path through which the subscriber's call is routed includes the ground station, switch 110, the subsystem, and switch 112. In one possible alternate embodiment, the subsystem sets up a route between the ground station and the ground telephone, and then drops from the call. In any event, once the subsystem has routed a call for the subscriber the set up procedure is exited (step 220). If the subscriber does not want to make a call, the subscriber enters a '1' in response to the prompt of step 214. In this case, the database subsystem responds by playing one or more possible status messages to the subscriber (step 222). Two possible status messages that the subsystem may use are:

Your personal call forwarding is cancelled.

Your personal calls will be forwarded to an aircraft at XXX-XXX-XXXX.

Following the status message(s) the subsystem prompts the subscriber for the next action (step 224). The following prompt may be used:

Enter '1' if this is correct.

Enter '2' to make a change or cancel call forwarding.

Enter '3' to review the status of the call.

The subsystem checks the subscriber's response (step 226) and proceeds accordingly. If a '3' is received, the subsystem loops back to step 222. If a '1' is received, the subsystem plays an exiting announcement to the subscriber (step 228) and exits the set up procedure (step 230). If a '2' is received, the subsystem responds with a detailed set up prompt (step 232). An example of such a prompt is:

Enter '1' to cancel call forwarding.

Enter '2' to change the number to which calls will be forwarded.

Enter '3' to change the length of time calls will be forwarded.

Enter '4' to select which calls will be forwarded.

Enter '5' to set the Ground-to-Air User PIN.

Enter '6' to activate call forwarding.

Upon receipt of a response to the detailed set up prompt, the subsystem takes appropriate action (step 234). If ground-to-air call forwarding is active and a '1' is received the subsystem simply deactivates the forwarding. If ground-to-air call forwarding is inactive and a '6' is received the subsystem activates the forwarding. If a response of '2', '3' or '5' is received, the subsystem must await receipt of a new parameter; namely, a new aircall number, a new duration of forwarding, or a new User PIN, respectively. In each case, the new parameter may be transmitted by the subscriber via DTMF signaling. A response of '4' indicates that the subscriber wants to receive only selected calls. One way for the subscriber to select calls is through ANI. To enable ANI type call selection, the subscriber notifies the subsystem, e.g., through DTMF signaling, of the telephone numbers from which the subscriber will receive calls. The subsystem stores these selected numbers, and thereafter, when a ground caller dials the special service number, the subsystem checks the number of the calling telephone (acquired through ANI) against the stored selected numbers. Only if the number of the calling telephone matches one of the stored numbers does the subsystem forward the call to the aircraft. After the subsystem has serviced the subscriber's response to the detailed set up prompt it plays an exiting announcement to the subscriber (step 228) and exits the setup procedure (step 230).

It should be noted that, throughout the above description of the invention it has been assumed that a call to the subscriber is initiated by a person via a conventional telephone. However, the invention is applicable to all types of calls initiated to the subscriber. For example, a "call" to the subscriber may take the form of a fax transmission, a computer transmission, a video call, or a multimedia call. Moreover, while the best mode for carrying out the invention has been described in detail, those familiar with the art to which the invention relates will recognize various alternative designs and embodiments for practicing the invention as defined by the following claims.

I claim:

1. A method for routing a call that is made by a calling party located on the ground, and directed to a subscriber located aboard an aircraft, comprising the steps of:

a) storing one or more ground-to-air forwarding parameters in a database, wherein one of said ground-to-air forwarding parameters is a Ground-to-Air User PIN;

b) accessing said database when said calling party on the ground places a call to said subscriber aboard the aircraft;

c) receiving a PIN entry from said calling party;

d) comparing said PIN entry to said Ground-to-Air User PIN to determine if there is a match; and e) when there is a match, routing the call to said subscriber according to said ground-to-air forwarding parameters, without requiring the calling party to hang up and wait for a return call from the subscriber.

2. A method according to claim 1, wherein said one or more ground-to-air forwarding parameters comprises an aircall number.

3. A method according to claim 1, wherein said one or more ground-to-air forwarding parameters comprises a seat number.

4. A method according to claim 1, wherein said one or more ground-to-air forwarding parameters comprises a start time of forwarding and a duration of forwarding.

5. A method according to claim 1, wherein the step of routing the call comprises the step of coupling the call to a ground station, said ground station providing a two-way radio link between the calling party's telephone and the aircraft.

6. A method according to claim 1, wherein the step of storing said one or more ground-to-air forwarding parameters comprises the steps of:

receiving a subscriber initiated call at a ground-to-air database subsystem, said ground-to-air database subsystem having stored therein a Master PIN for the subscriber;

receiving a PIN entry from the subscriber;

comparing said PIN entry to said Master PIN to determine if there is a match; and when there is a match, (i) receiving said one or more ground-to-air forwarding parameters from the subscriber, and (ii) storing said received forwarding parameters.

7. A method according to claim 6, wherein the step of receiving a PIN entry comprises the step of receiving one or more DTMF signals indicative of said PIN entry.

8. A method according to claim 6, wherein the step of receiving a PIN entry comprises the step of receiving one or more voice signals indicative of said PIN entry.

9. A method according to claim 1, wherein the step of storing said one or more ground-to-air forwarding parameters comprises the steps of:

receiving a subscriber initiated call at a ground-to-air database subsystem, said ground-to-air database subsystem having stored therein a Master PIN for the subscriber;

prompting the subscriber for a PIN entry;

receiving said PIN entry from the subscriber;

comparing said PIN entry to said Master PIN to determine if there is a match; and when there is a match, (i) prompting the subscriber for said one or more ground-to-air forwarding parameters, (ii) receiving said forwarding parameters from the subscriber, and (iii) storing said received forwarding parameters.

10. A method according to claim 1, wherein the step of routing the call comprises the steps of:

receiving the call at a ground-to-air database subsystem, said ground-to-air database subsystem having stored therein a Ground-to-Air User PIN for the subscriber;

receiving a PIN entry from the calling party;

comparing said PIN entry to said Ground-to-Air User PIN to determine if there is a match; and when there is a match, routing the call to the subscriber.

11. A method according to claim 10, wherein the step of receiving a PIN entry comprises the step of receiving one or more DTMF signals indicative of said PIN entry.

12. A method according to claim 10, wherein the step of receiving a PIN entry comprises the step of receiving one or more voice signals indicative of said PIN entry.

13. A method according to claim 1, wherein the step of routing the call comprises the steps of:

receiving the call at a ground-to-air database subsystem, said ground-to-air database subsystem having stored therein a Ground-to-Air User PIN for the subscriber;

prompting the calling party for a PIN entry;

receiving said PIN entry from the calling party;

comparing said PIN entry to said Ground-to-Air User PIN to determine if there is a match; and when there is a match, routing the call to the subscriber.

14. A method for routing a call that is made by a calling party at an originating communication device located on the ground, and is directed to a subscriber at a terminating communication device located aboard an aircraft, comprising the steps of:

a) comparing a PIN entry entered by the calling party with a Ground-to-Air User PIN, and b) when there is a match, acquiring an identification number for the originating communication device; and c) passing said identification number to the aircraft for inspection by the subscriber, without requiring the calling party to hang up and wait for a return call from the subscriber.

15. A method according to claim 14, wherein the step of acquiring an identification number comprises the step of acquiring a telephone number for the originating communication device through ANI.

16. A method according to claim 14, wherein the step of routing the call comprises the steps of:

coupling the call to a ground station; and passing said ground-to-air forwarding parameters to said ground station for use in establishing a two-way radio link between the originating communication device and the aircraft.

17. A method according to claim 14, wherein the step of routing the call comprises the steps of:

receiving the call at a ground-to-air database subsystem, said ground-to-air database subsystem having stored therein a Ground-to-Air User PIN for the subscriber;

receiving a PIN entry from the calling party;

comparing said PIN entry to said Ground-to-Air User PIN to determine if there is a match; and when there is a match, routing the call to the subscriber.

18. A method according to claim 17, wherein the step of receiving a PIN entry comprises the step of receiving one or more DTMF signals indicative of said PIN entry.

19. A method according to claim 17, wherein the step of receiving a PIN entry comprises the step of receiving one or more voice signals indicative of said PIN entry.

20. A method according to claim 14, wherein the step of routing the call comprises the steps of:

receiving the call at a ground-to-air database subsystem, said ground-to-air database subsystem having stored therein a Ground-to-Air User PIN for the subscriber;

prompting the calling party for a PIN entry;

receiving said PIN entry from the calling party;

comparing said PIN entry to said Ground-to-Air User PIN to determine if there is a match; and when there is a match, routing the call to the subscriber.

21. A system for routing a call that is made by a calling party at an originating communication device located on the ground, and directed to a subscriber at a terminating communication device located aboard an aircraft, comprising:

a) means for accessing one or more ground-to-air forwarding parameters;

b) means for matching a caller entered PIN with a Ground-to-Air User PIN;

c) means for routing the call to the subscriber according to said one or more ground-to-air forwarding parameters if the caller-entered PIN matches the Ground-to-Air User PIN, without requiring the calling party to hang up and wait for a return call from the subscriber.

22. A system according to claim 21, further comprising a ground station for completing a two-way radio link between the originating communication device and the aircraft.

23. A system according to claim 21, wherein said means for accessing comprises an AT&T Quantum Data Routing System.

24. A system according to claim 21, further comprising means for storing said one or more ground-to-air forwarding parameters.

* * * * *